O. Brueck,

Fan.

No. 108,681. Patented Oct. 25, 1870.

Witnesses.
C. Wahlers
E. F. Kastenhuber

Inventor.
Otto Brueck

United States Patent Office.

OTTO BRUECK, OF NEW YORK, N. Y.

Letters Patent No. 108,681, dated October 25, 1870.

IMPROVEMENT IN FANS.

The Schedule referred to in these Letters Patent and making part of the same.

*To all whom it may concern:*

Be it known that I, OTTO BRUECK, of the city, county, and State of New York, have invented a new and useful Improvement in Fans; and I do hereby declare the following to be a full, clear, and exact description thereof, which will enable those skilled in the art to make and use the same, reference being had to the accompanying drawing forming part of this specification, in which drawing—

Similar letters indicate corresponding parts.

Figure 1:
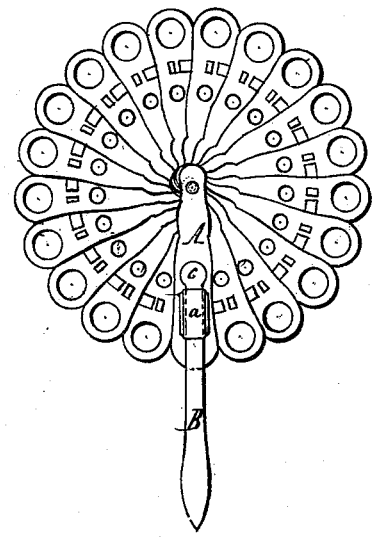
Figure 1 represents a front view of this invention when the handle is drawn out.

This invention consists in the arrangement of a loop punched out of sheet-metal, and secured by projecting points to the cover or extreme leaf of a fan, in combination with a handle, which slides in said loop in such a manner that said handle can be drawn out or pushed in at pleasure, and that the same, when drawn out, can retain its position, and at the same time the full strength of the handle is preserved.

In the drawing—

The letter A designates the extreme leaf or side of a circular fan.

On this leaf I secure a loop, $a$, which is punched out of sheet metal, and formed with spurs $b$, which can be readily passed through slots in the leaf and turned over on the inside thereof, so as to retain said loop firmly in position without requiring rivets or other means for fastening the same.

This loop straddles the handle B, which is provided at one end with a head, $c$, while its opposite end is enlarged, so that the same is free to slide in the loop within certain limits, being prevented from being drawn through the loop by the head at one and the enlarged part at the opposite end.

Figure 2:
Figure 2 is a transverse vertical section of the same.
Figure 3:
Figure 3 is a side view of the handle on a larger scale than the previous figure.
Figure 4:
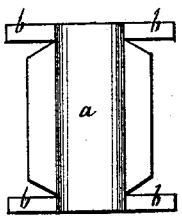
Figure 4 is a detached plan of the guide-loop, which forms the connection between the handle and the cover of the fan.

A similar handle is attached to either of the leaves of a fan, and if the fan is opened, these handles are drawn out, as shown in figs. 1 and 2; but if the fan is closed, the handles are pushed in, thereby reducing the space occupied by the fan, and allowing it to be conveniently carried in the pocket or packed in the smallest possible compass.

When the handle is drawn out it is kept steady by the loop, and the fan can be operated with ease and convenience, and at the same time the full strength of the handle is preserved.

What I claim as new, and desire to secure by Letters Patent, is—

As a new article of manufacture, a folding-fan, provided with sliding handles B, secured to the cheeks A by means of loops $a$, which have spurs $b$, the whole constructed and operating substantially in the manner herein shown and described.

This specification signed by me this 14th day of September, 1870.

OTTO BRUECK.

Witnesses:
W. HAUFF,
E. F. KASTENHUBER.